United States Patent
Olbert et al.

(10) Patent No.: US 10,576,449 B2
(45) Date of Patent: Mar. 3, 2020

(54) REACTOR FOR CARRYING OUT HETEROGENEOUSLY CATALYSED GAS PHASE REACTIONS, AND USE OF THE REACTOR

(71) Applicant: BASF SE, Ludwigshafen am Rhein (DE)

(72) Inventors: Gerhard Olbert, Dossenheim (DE); Andreas Wölfert, Bad Rappenau (DE); Holger Friedrich, Worms (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/062,669

(22) PCT Filed: Dec. 16, 2016

(86) PCT No.: PCT/EP2016/081571
§ 371 (c)(1),
(2) Date: Jun. 15, 2018

(87) PCT Pub. No.: WO2017/103199
PCT Pub. Date: Jun. 22, 2017

(65) Prior Publication Data
US 2018/0369780 A1 Dec. 27, 2018

(30) Foreign Application Priority Data
Dec. 16, 2015 (EP) .................................... 15200506

(51) Int. Cl.
*B01J 19/24* (2006.01)
*B01J 8/04* (2006.01)
(Continued)

(52) U.S. Cl.
CPC .......... *B01J 19/2485* (2013.01); *B01J 8/008* (2013.01); *B01J 8/0214* (2013.01); *B01J 8/0453* (2013.01);
(Continued)

(58) Field of Classification Search
CPC ........ B01J 19/305; B01J 8/008; B01J 8/0453; B01J 8/0492; B01J 8/025; B01J 8/0278;
(Continued)

(56) References Cited

U.S. PATENT DOCUMENTS 2,302,295 A 11/1942 Buxton
2,768,882 A * 10/1956 Mattson ................... B01J 8/008
208/146

(Continued)

FOREIGN PATENT DOCUMENTS

CA 2901260 A1 8/2014
DE 2302295 A1 7/1974
(Continued)

OTHER PUBLICATIONS

International Search Report for PCT/EP2016/081571 dated Apr. 12, 2017.
(Continued)

*Primary Examiner* — Lessanework Seifu
(74) *Attorney, Agent, or Firm* — Drinker Biddle & Reath LLP

(57) ABSTRACT

The invention relates to a reactor for carrying out heterogeneously catalyzed gas-phase reactions, having an internal element (11, 35) or a plurality of internal elements (11, 35) which are arranged in succession in the flow direction of the gas mixture of the heterogeneously catalyzed gas-phase reaction through the reactor (10), where the internal elements extend over the entire reactor cross section, wherein
(Continued)

Figure 1:
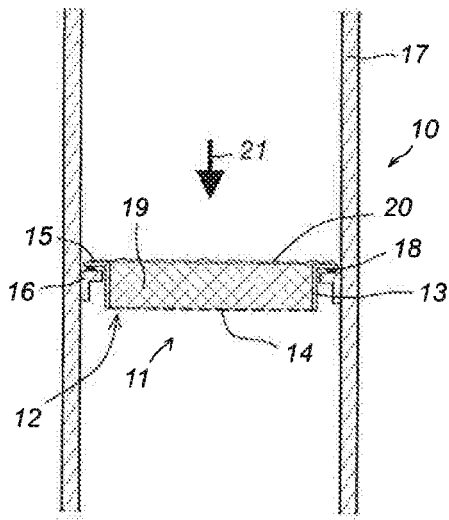

the one or more internal elements (11, 35) is/are at least partly made of a fiber composite ceramic material.

20 Claims, 6 Drawing Sheets

(51) Int. Cl.
    *B01J 8/00*          (2006.01)
    *B01J 8/02*          (2006.01)

(52) U.S. Cl.
    CPC ........... *B01J 8/0492* (2013.01); *B01J 8/0496* (2013.01); *B01J 2208/00814* (2013.01); *B01J 2208/00884* (2013.01); *B01J 2219/2438* (2013.01); *B01J 2219/2443* (2013.01)

(58) Field of Classification Search
    CPC ........ B01J 2219/2438; B01J 2219/2443; B01J 19/2485; B01J 2208/00884; B01J 8/00814
    See application file for complete search history.

(56) References Cited

U.S. PATENT DOCUMENTS

| | | | |
|---|---|---|---|
| 3,235,344 A * | 2/1966 | Dreyer | B01D 3/32 208/109 |
| 3,996,025 A | 12/1976 | Gulden | |
| 4,070,393 A * | 1/1978 | Angstadt | B01J 8/0278 558/328 |
| 4,830,833 A | 5/1989 | Shaff | |
| 9,725,320 B2 | 8/2017 | Olbert et al. | |
| 9,845,534 B2 | 12/2017 | Delperier et al. | |
| 2008/0143005 A1 * | 6/2008 | Lim | C04B 35/565 264/29.2 |
| 2012/0157737 A1 | 6/2012 | Olbert et al. | |
| 2014/0171709 A1 | 6/2014 | Olbert et al. | |
| 2014/0227160 A1 * | 8/2014 | Olbert | E04B 1/942 423/392 |
| 2016/0200575 A1 * | 7/2016 | Olbert | B01J 8/008 423/392 |
| 2018/0305210 A1 | 10/2018 | Olbert et al. | |

FOREIGN PATENT DOCUMENTS

| | | |
|---|---|---|
| DE | 2439144 A1 | 2/1976 |
| WO | WO-9108982 A1 | 6/1991 |
| WO | WO-2014125023 A1 | 8/2014 |
| WO | WO-2014125024 A1 | 8/2014 |
| WO | WO-2015022247 A1 | 2/2015 |
| WO | WO-2015136193 A1 | 9/2015 |
| WO | WO 2016/016088 * | 2/2016 |
| WO | WO-2016055452 A1 | 4/2016 |
| WO | WO-2016055453 A1 | 4/2016 |

OTHER PUBLICATIONS

Written Opinion of the International Searching Authority for PCT/EP2016/081571 dated Apr. 12, 2017.

English Translation of International Preliminary Report on Patentability for International Application No. PCT/EP2016/081571, dated Mar. 23, 2018.

\* cited by examiner

REACTOR FOR CARRYING OUT HETEROGENEOUSLY CATALYSED GAS PHASE REACTIONS, AND USE OF THE REACTOR

CROSS-REFERENCE TO RELATED APPLICATIONS

This application is a national stage application (under 35 U.S.C. § 371) of PCT/EP2016/081571, filed Dec. 16, 2016, which claims benefit of European Application No. 15200506.2, filed Dec. 16, 2015, both of which are incorporated herein by reference in their entirety.

The invention relates to a reactor for carrying out heterogeneously catalyzed gas-phase reactions and also a use.

In reactors for carrying out heterogeneously catalyzed gas-phase reactions, the reaction temperatures frequently reach values in the range from about 600 to 150° C., in particular in the range from about 800 to 100° C.

In order to keep these high temperatures away from the pressure wall of the reactor, the heterogeneous catalyst, which is frequently present in the form of a bed, is installed in catalyst baskets which are supported by suitable rests, holders or consoles arranged on the reactor wall. Metal alloys are generally used as material for such catalyst baskets. During operation of the reactor, the catalyst basket expands, with the linear expansion of a typical nickel-chromium alloy, for example the highly heat-resistant alloy Inconel™ 600 (material number 2.4816) having a coefficient of linear expansion of $18-20 \times 10^{-6}$ 1/K, being about 80-90 mm at a reaction temperature of 1000° C. and a reactor diameter of 5 m. Due to this expansion of the metal basket, the bed of the heterogeneous catalyst settles in the outer region of the basket. When the reactor is repeatedly started up and run down, the heating and cooling cycle is repeated, as a result of which the depression in the bed in the outer region of the catalyst basket becomes ever deeper. This leads to a bypass for the gas stream at the outer margin of the bed. In addition, the shrinkage of the basket during cooling can crush the catalyst particles. Depending on the use, decreases in yield, increased breakthrough of pollutants or accelerated catalyst aging have to be accepted. A further disadvantage is the decrease in strength of the metal alloys at the high reaction temperatures. The catalyst grating which bears the weight of the bed is mainly affected by this. A remedy thereto can be provided by supporting the grating on cooled surfaces, for example on cooling tubes or tube plates. However, this results in the grating and the catalyst basket expanding to different extents, so that the internals can distort or rupture. This leads to reduced operating times of the reactor, accompanied by corresponding economic disadvantages.

The present invention therefore addresses the technical problem of providing a reactor for carrying out heterogeneously catalyzed gas-phase reactions at high reaction temperatures, which largely overcomes the above-described disadvantages.

This technical problem is solved by the reactor having the features of the present claim 1. Advantageous embodiments of the reactor of the invention are subject matter of the dependent claims.

The invention accordingly provides a reactor for carrying out heterogeneously catalyzed gas-phase reactions, having an internal element or a plurality of internal elements which are arranged in succession in the flow direction of the gas mixture of the heterogeneously catalyzed gas-phase reaction through the reactor, where the internal elements extend over the entire reactor cross section. In the inventive reactor, the one or more internal elements is/are at least partly, preferably entirely, made of a fiber composite ceramic material.

The internal elements are preferably internal elements for accommodating a heterogeneous catalyst. However, the internal elements can additionally comprise quiescent elements through which the reaction gas does not flow and therefore usually also do not comprise any catalyst material. These quiescent elements can be dummy bodies which can be installed in place of catalyst-comprising internal elements, for example when the reactor is operated at low load. The dummy bodies have to be configured so that bypass of reaction gases is prevented. The dummy bodies are therefore preferably configured as plates or boxes.

The use provided according to the invention of internal elements made of fiber composite ceramic materials ensures that the internal elements have reduced thermal expansion and an increased high-temperature strength, so that the above-described problems with the use of internals made of metal alloys do not occur or occur only to a significantly smaller extent.

Individual components of the internal elements, in particular those which are not critical to the thermal expansion behavior, can also be made of materials other than the fiber composite ceramic material, for example meshes or gauzes, especially when they are not fixed to the basic structure of the internals. The internal elements are particularly advantageously formed virtually entirely, particularly preferably entirely, by a fiber composite ceramic material.

The fiber composite ceramic material is, in particular, composed of a ceramic matrix in which ceramic fibers are embedded.

The fiber composite ceramic materials used according to the invention are characterized by ceramic fibers, in particular long fibers, which are embedded as wound bodies or as textile in a matrix composed of ceramic particles. Such materials are referred to as fiber-reinforced ceramic, composite ceramic or simply fiber ceramic. Matrix and fiber can in principle consist of all known ceramic materials, with carbon also being considered to be a ceramic material in this context.

Possible fibers are reinforcing fibers of the classes of oxidic, carbidic, nitridic fibers or C fibers and SiBCN fibers. Particular preference is given to the fibers of the ceramic composite material being aluminum oxide, mullite, silicon carbide, zirconium oxide and/or carbon fibers. Mullite consists of mixed crystals of aluminum oxide and silicon oxide. The use of fibers composed of oxide ceramic ($Al_2O_3$, $SiO_2$, mullite) or of nonoxidic ceramic (C, SiC) is preferred.

The ceramic matrix and/or the ceramic fibers are preferably made of an oxide ceramic. Very particular preference is given to the internal elements consisting of oxide-ceramic fibers which are embedded in an oxide-ceramic matrix. Such oxide-ceramic systems are particularly chemically stable and long-lived and can therefore be used in demanding, in particular corrosive, reaction environments. Such an oxide-ceramic system can also comprise mixtures of different oxide-ceramic fibers.

It is advantageous to use creep-resistant fibers, i.e. fibers which display no, or only a minimal, increase in the permanent deformation over time, i.e. the creep, in the creep range, viz. the temperature range up to 1400° C. The 3M company indicates the following limiting temperatures for a permanent deformation of 1% after 1000 hours under a tensile stress of 70 MPa for the NEXTEL™ fibers: NEXTEL™ 440: 875° C., NEXTEL™ 550 and NEXTEL™ 610: 1010° C., NEXTEL™ 720: 1120° C. (reference: Nextel™

Ceramic Textiles Technical Notebook, 3M, 2004). Chemically, the fibers display a high creep resistance such that the strength is, in particular, ensured under atmospheric air at high operating temperatures.

The fibers advantageously have a diameter in the range from 10 to 12 μm. They are advantageously interwoven, usually with a linen or satin weave, to form textile strips, knitted to produce tubing or wound as fiber bundles around a pattern. To produce the ceramic composite system, the fiber bundles or fabrics are, for example, Infiltrated with a slip comprising the components of the future ceramic matrix, advantageously $Al_2O_3$ or mullite (see, for example, Schmücker, M. (2007): "Faserverstärkte oxidkeramische Werkstoffe", Materialwissenschaft und Werkstofftechnik, 38(9), 698-704). Heat treatment at >700° C. finally gives a high-strength composite structure composed of the ceramic fibers and the ceramic matrix and having a tensile strength of advantageously >50 MPa, preferably >70 MPa, more preferably >100 MPa, in particular >120 MPa.

SiC/SiC, C/C, C/SiC, $Al_2O_3/Al_2O_3$ and/or mullite/mullite is/are preferably used as ceramic fiber composite material. Here, the material before the oblique stroke designates the fiber type and the material after the oblique stroke designates the matrix type. As matrix system for the ceramic fiber composite structure, it is also possible to use siloxanes, Si precursors and various oxides, for example zirconium oxide.

For the purposes of the present invention, preference is given to using fiber composite materials based on oxide-ceramic fibers, for example 3M™ NEXTEL™ 312, NEXTEL™ 440, NEXTEL™ 550, NEXTEL™ 610 or NEXTEL™ 720. The use of NEXTEL 720 is particularly preferred. NEXTEL 720 is designed for a long-term use temperature of 1370° C. The coefficient of expansion is $6.0 \times 10^{-6}$/K. For example, NEXTEL™ 720 can be used in the form of textile mats.

The matrix has a degree of fill with fibers (proportion by volume of fibers in the composite structure) of from 20 to 40%, and the total solids content of the composite structure is in the range from 50 to 80%. Fiber composite ceramics based on oxidic ceramic fibers are chemically stable in oxidizing and reducing gas atmospheres (i.e. no weight change after storage in air at 1200° C. for 15 h (reference: Nextel™ Ceramic Textiles Technical Notebook, 3M, 2004)) and thermally stable up to above 1300° C. Fiber composite ceramics have pseudoductile deformation behavior. The fiber composite materials are thus resistant to temperature changes in accordance with DIN EN 993-11 and possess a pseudo tough fracture behavior. Thus, failure of a component becomes apparent before it breaks.

The fiber composite material, in particular the oxide-ceramic fiber composite material, has the following advantageous properties:

The fiber composite material advantageously has a porosity of from 20% to 50%; it is accordingly not gastight according to the definition in DIN 623-2.

The fiber composite material advantageously has a maximum long-term use temperature of from 1000 to 1500° C., preferably from 1100 to 1400° C., in particular from 1200 to 1300° C.

The fiber composite material advantageously has a strength of from 50 to 130 [MPa], preferably from 70 to 120 [MPa], in particular from 80 to 100 [Mpa].

The fiber composite material advantageously has an elastic deformation limit of from 0.2 to 1%.

The fiber composite material is advantageously resistant to temperature changes in a test in accordance with DIN EN 993-11 at the intended use temperatures.

The fiber composite material advantageously has a coefficient of thermal expansion of from 3 to $12 \times 10^{-6}$/K, particularly preferably from 5 to $8 \times 10^{-6}$/K.

The fiber composite material advantageously has a thermal conductivity [W/m/K] of from 0.5 to 30, preferably from 2 to 5.

The fiber composite ceramic material can be produced by CVI (Chemical Vapor Infiltration) processes, pyrolysis, in particular LPI (Liquid Polymer Infiltration) processes, by chemical reaction such as LSI (Liquid Silicon Infiltration) processes or by the WHIPOX™ (Wound Highly Porous Oxide Composite) process.

The oxidic fiber composite ceramic materials in particular have the following properties which are advantageous for the use according to the invention:
- a low coefficient of thermal expansion (for mullite about $4 \times 10^{-6}$/K, for aluminum oxide about $8 \times 10^{-6}$/K, in contrast for stainless steel 1.4841 $15 \times 10^{-6}$/K);
- a low specific gravity (mullite about 2 g/ml compared to about 8 g/l for stainless steel 1.4841);
- creep resistance to 1300° C.;
- chemical resistance (no undesirable reactions, no corrosion);
- owing to the specific manufacturing processes, components composed of oxidic fiber composite ceramic materials can also be produced with complex geometries in a simple manner.

The reactor of the invention is designed for carrying out heterogeneously catalyzed gas-phase reactions at reaction temperatures in the range from 600 to 1500° C., preferably even at reaction temperatures in the range from 800 to 1000° C. For the present purposes, the reaction temperature is the maximum temperature which is attained in the reactor while carrying out the heterogeneously catalyzed gas-phase reaction.

The reactor of the invention has one or more internal elements arranged in succession in the flow direction of the gas mixture of the heterogeneously catalyzed gas-phase reaction through the reactor for accommodating the heterogeneous catalyst which can, in particular, be present as a bed or as a monolith. These in each case extend, optionally in combination with dummy bodies, over the entire reactor cross section.

The catalyst material can be arranged in one or more layers, for example in catalyst layers having different catalytic activities, in each internal element. In the case of bed catalysts, the layers can optionally be separated from one another by a sheet-like arrangement of gauzes. When monoliths are used, different monoliths can be arranged above one another.

The reactor is preferably a reactor for carrying out heterogeneously catalyzed gas-phase reactions on an industrial scale. The reactor therefore preferably has a reactor cross section in the regions in which the internal element is arranged or in which the plurality of internal elements are arranged which is greater than 0.25 m², particularly preferably greater than 1 m².

The maximum reactor cross section is preferably in the range from 5 to 50 m², in particular from 10 to 30 m².

The reactor of the invention can have any reactor cross section, for example a circular, elliptical or polygonal cross section. The reactor preferably has a circular or approximately circular reactor cross section, so that the reactor preferably has an overall cylindrical, for example also flat-cylindrical, shape, i.e. the reactor in this case has an essentially cylindrical reactor wall, which is particularly advantageous for reactor walls which are subjected to pressure.

In one embodiment, the one or more internal elements arranged in succession in the reactor in the flow direction of the gas mixture of the heterogeneously catalyzed gas-phase reaction is/are in each case configured as one-piece internal elements. In the present context, "one-piece" means that an internal element extends over the entire internal cross section of the reactor and is not divided further into individual internal elements arranged next to one another. However, the term "one-piece internal element" is not restricted to single-part internal elements but for the purposes of the present invention, a "one-piece internal element" can consist of a plurality of components.

The one-piece element is preferably configured as a one-piece basket having a closed vertical side wall and a perforated bottom. The perforations in the bottom preferably have an opening ratio of from 30 to 80%, preferably from 40 to 60%. The bottom can be integrated in a fixed manner into the basket or can also be configured as a loose bottom.

In the preferred embodiment in which the reactor has a cylindrical shape, the side wall of the one-piece basket is likewise a cylindrical wall.

In an advantageous embodiment, the cylindrical closed vertical side wall is angled outward at its top end to form a horizontal, load-bearing annular plate. This allows simple positioning of the one-piece basket on a rest.

The rest is preferably configured as an annular console fastened to the inside of the reactor wall, in particular welded to the reactor wall. Materials used for the rest are high-temperature materials, in particular high-temperature-resistant steels.

In an advantageous embodiment, the rest is a step section integrated into the reactor wall. The step section comprises a vertical side wall and a horizontal annular protuberance projecting into the interior of the reactor. The step section is advantageously configured as a rotationally symmetric component which can be used by turning or milling. The step section of the wall is, in particular, able to be welded into the reactor wall. The step section can advantageously also have an integrated flange.

A seal is advantageously provided between the horizontally angled annular plate at the upper end of the vertical side wall and the rest. This prevents undesirable bypass of the reaction gas mixture. In addition, thermal insulation of the basket from the reactor wall is achieved.

In an advantageous embodiment, the seal is made of high-temperature-resistant mineral fiber materials, for example fiber strings, single-layer or multilayer fiber tapes or single-layer or multilayer fiber mats. The fibers typically consist of alkaline earth metal silicates or aluminum silicates.

Particular preference is given to using fiber mats or swellable fiber mats or tapes as are described, for example, in the international patent application WO/2014/125023 by the applicant as sealing material.

Swellable fiber mats are sheet-like inserts which expand (swell) in the event of temperature increases. Swellable fiber mats are generally composed of silicates, e.g. aluminum silicate fibers, an expandable mica, e.g. vermiculite, and an organic binder.

Fiber mats and swellable fiber mats are marketed, for example, by the 3M company under the trade name INTERAM®.

Such fiber mats or swellable fiber mats are sheet-like structures having a thickness in the range from about 3 to 20 mm, preferably in the range from about 5 to 10 mm. Width and length of the swellable fiber mats are determined by the method of manufacture and are in each case in the range from about 0.5 to 5 m. Typical dimensions of swellable fiber mats are 1.20 m×4 m. Swellable fiber mats are generally composed of silicates, preferably in fiber form, e.g. aluminum silicate, an expandable mica, i.e. a material which expands in the event of a temperature increase, e.g. the nontoxic vermiculite, and an organic binder. Such swellable fiber mats are marketed, for example, by the 3M company under the trade name INTERAM®. In a preferred embodiment, the organic binder is present in the form of organic polymer fibers, especially in the form of organic polymer fibers having two or more melting ranges. Swellable fiber mats comprising silicate fibers, an expandable mica and organic polymer fibers are particularly advantageous since they have springy properties and thus ensure excellent sealing by clamping between the components between which hollow spaces have to be bridged: in the event of a temperature increase, as soon as the first or only melting range is attained, the organic polymer fibers begin to melt and the silicates present in fiber form begin to crosslink (stick together). The silicate fibers thereby form a fiber framework having hollow spaces in which the expandable mica is present. At elevated temperature, the expandable mica exerts a stress on the fiber framework and expands the latter. When the temperature drops again, the volume of the expandable mica decreases but the stress continues to maintain the fiber framework.

The swellable fiber mats are preferably enclosed on all sides in a film composed of a polymer. After the swellable fiber mat has been enclosed in the polymer film, a vacuum is applied to the interior space which is enclosed by the polymer film and comprises the swellable fiber mat. When the vacuum is released, the swellable fiber mat expands to up to twice its thickness in the evacuated state. This makes it possible for the components provided for assembly to be put together loose, with play, without application of forces while nevertheless ensuring that the swellable fiber mat which expands when the vacuum is released securely fixes the components. The vacuum in the interior space comprising the swellable fiber mat can be released in a simple manner by piercing or cutting the polymer film. In addition or as an alternative, the vacuum in the interior space which is enclosed by the polymer film and comprises the swellable fiber mat can be released by subjecting the swellable fiber mat to an elevated temperature at which the polymer film burns. The individual evacuated swellable fiber mats are preferably juxtaposed with right-angled rebated edges or by means of a rectangular tongue-and-groove system, so that the closeness of the join is ensured.

In one embodiment of the reactor of the invention, the fiber composite ceramic material for the one or more one-piece internal elements, for example for the one-piece basket, is selected so that the internal element is self-supporting. For the purposes of the present invention, self-supporting means that the oxide-ceramic internal element can within its own structure withstand the mechanical stresses (weight of the bed, own weight, force due to a pressure drop) under operating conditions without auxiliary supports.

In a further preferred embodiment, the one or more internal elements arranged in succession in the flow direction of the gas mixture of the heterogeneously catalyzed gas-phase reaction through the reactor have a multipiece configuration. In the present context, a "multipiece internal element" is an internal element which consists of a plurality of identical or similar individual internal components which are arranged next to one another in the reactor and together essentially fill the internal cross section of the reactor. Each internal component of these multipart internal elements can itself once again be in one piece or consist of a plurality of components.

The one or more, multipiece internal elements arranged in succession in the flow direction of the gas mixture of the heterogeneously catalyzed gas-phase reaction can comprise a plurality of, in particular three, four or more, gratings. The gratings are preferably positioned loose next to one another on supports.

As an alternative to or in addition to the gratings, the multipiece internal elements can comprise a plurality of, in particular three, four or more, individual baskets, with the baskets each having their own side walls and perforated bottoms. The baskets are preferably positioned loose next to one another directly on supports or on gratings arranged above the supports. The individual baskets are preferably sealed against one another and against the inside of the reactor wall, in particular by means of the above-described fiber mats or another suitable joint filling material.

In the present context, "gratings" are sheet-like perforated plates or meshes on which either catalyst material can be arranged directly as bed or as monoliths or which serve as underlay for baskets. The gratings allow passage of gas and otherwise are configured so that the catalyst material or the baskets are supported securely. For the purposes of the present invention, "baskets" likewise have a gas-permeable bottom and can likewise be filled with catalyst material as bed or as monoliths. In contrast to gratings, baskets also have an upward-projecting side wall which bounds the catalyst material at the side. Once again, as described above, a plurality of catalyst layers, for example catalyst layers having different activities, can be arranged in the baskets or on the gratings.

The support arrangement on which the individual baskets and/or individual gratings are in each case arranged next to one another have to allow passage of the gas mixture of the heterogeneously catalyzed gas-phase reaction through them. This can be ensured by provision of a plurality of supports, for example rod-shaped supports, which are arranged at a distance from one another and/or by the supports being perforated; in particular, sheet-like supports, preferably have perforations for passage of the gas.

The supports and the multipiece internals preferably consist entirely or partly of fiber ceramic composite materials. In this case, the supports can be configured as geometric and simple-to-produce components which are optimized for high strength. Supports used are, in particular, T-supports, double-T-supports or profiled, in particular wavy, perforated elements. The multipiece internals such as gratings and baskets are carried by the supports and can be configured as complex components, for example as components having a fine mesh structure which brings about no pressure drop when gas passes through it, in the bottom. Since the multipiece internals are carried by the stable supports, the strength of the internals can be reduced in favor of complexity.

In the embodiment having multipiece internal elements which are arranged on supports, the multipiece internal elements and also the supports are preferably made of fiber composite ceramic materials. A fiber composite material having a high strength compared to the fiber composite ceramic material for the internal elements is advantageously selected for the supports.

In this embodiment, it is thus possible for the supports, which have a simpler geometry compared to the internal elements, to have longer fibers embedded in the matrix so as to achieve a higher strength of the fiber composite ceramic material compared to the material for the internal elements whose geometry is generally more complex.

In a preferred embodiment, two, three or more internal elements are provided and are arranged in the reactor in such a way that the gas mixture of the heterogeneously catalyzed gas-phase reaction can flow through them in succession.

In this embodiment, additional feed points and mixing-in devices for additional gas can be provided between the individual internal elements.

In the present embodiment having two, three or more internal elements arranged in succession, the reactor can advantageously have a conical geometry; this reactor geometry also has, in particular, the advantage that rests on the interior wall of the reactor do not interfere during replacement of individual internal elements, so that this replacement can be carried out more simply.

The preferred fields of use of the reactor of the invention include use as combustion furnace or combustion chamber, for example for complete oxidation/combustion of organic compounds, as reactor for the partial oxidation of organic compounds, for example for the production of formaldehyde from the oxidation of methanol, as reactor for the production of synthesis gas, in particular by partial oxidation or autothermal reforming of natural gas or by means of a reverse water gas shift reaction, as reactor for ammonia oxidation, i.e. for partial oxidation in the presence of ammonia, for example for preparing acrylonitrile from propylene and/or acrolein or methacrylonitrile from isobutene and/or methacrolein, as a reactor for dehydrogenation, in particular for the oxidative dehydrogenation of hydrocarbons, for example for the preparation of propene from propane, as reactor for oxidation of inorganic compounds, for example for $SO_2$ oxidation or for the preparation of nitric acid by oxidation of ammonia, or as reactor for offgas purification, for example for decomposition of $N_2O$ and catalytic after-combustion or for flue gas purification.

The invention is illustrated below with the aid of preferred embodiments depicted in the accompanying drawings.

Figure 2:
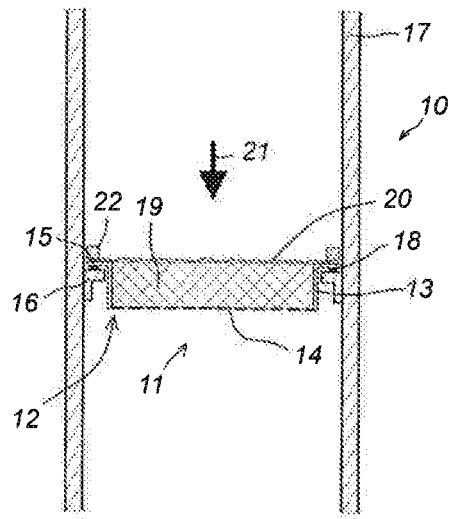
Figure 3:
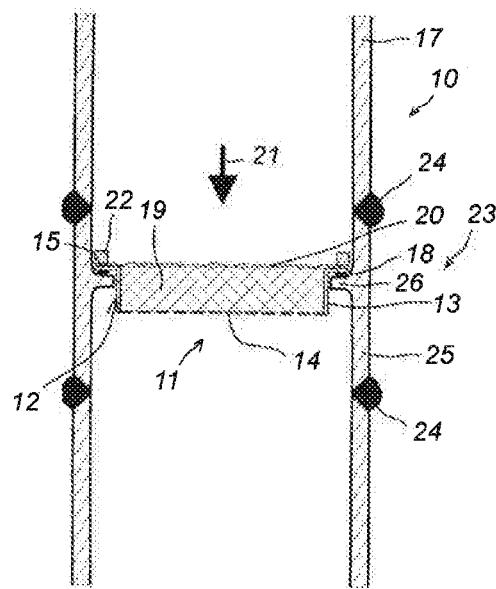
Figure 4:
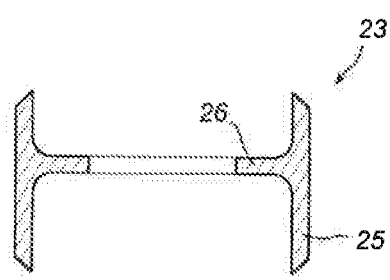
Figures 5, 6:
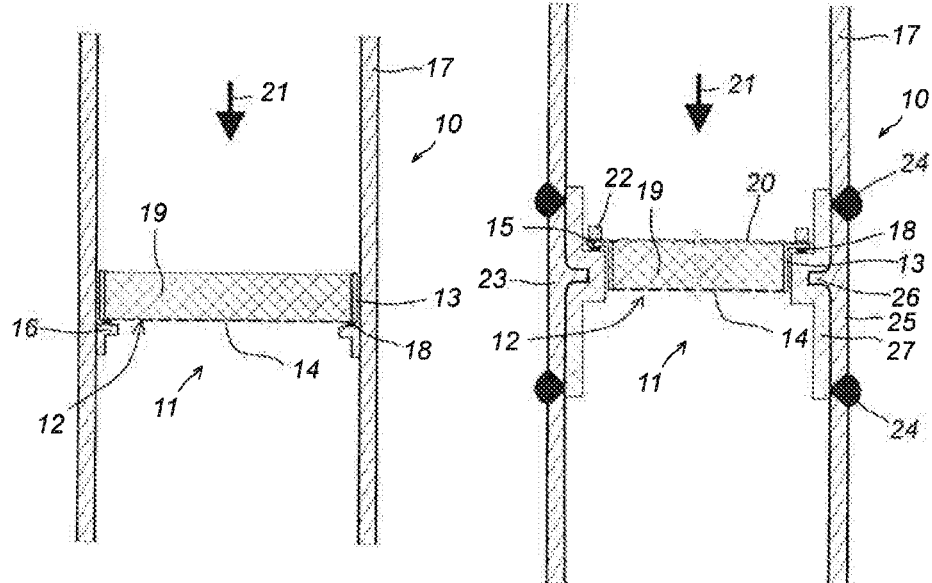
Figures 7, 8:
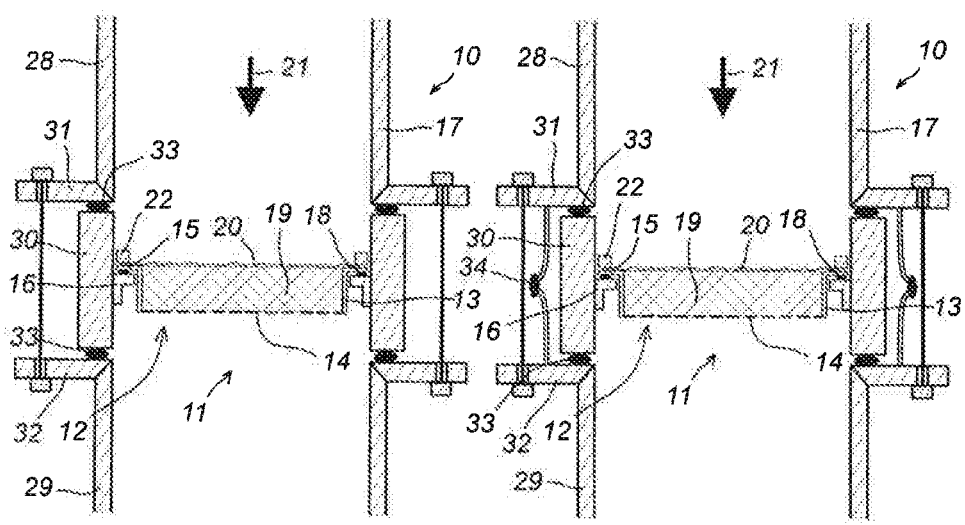
Figure 9:
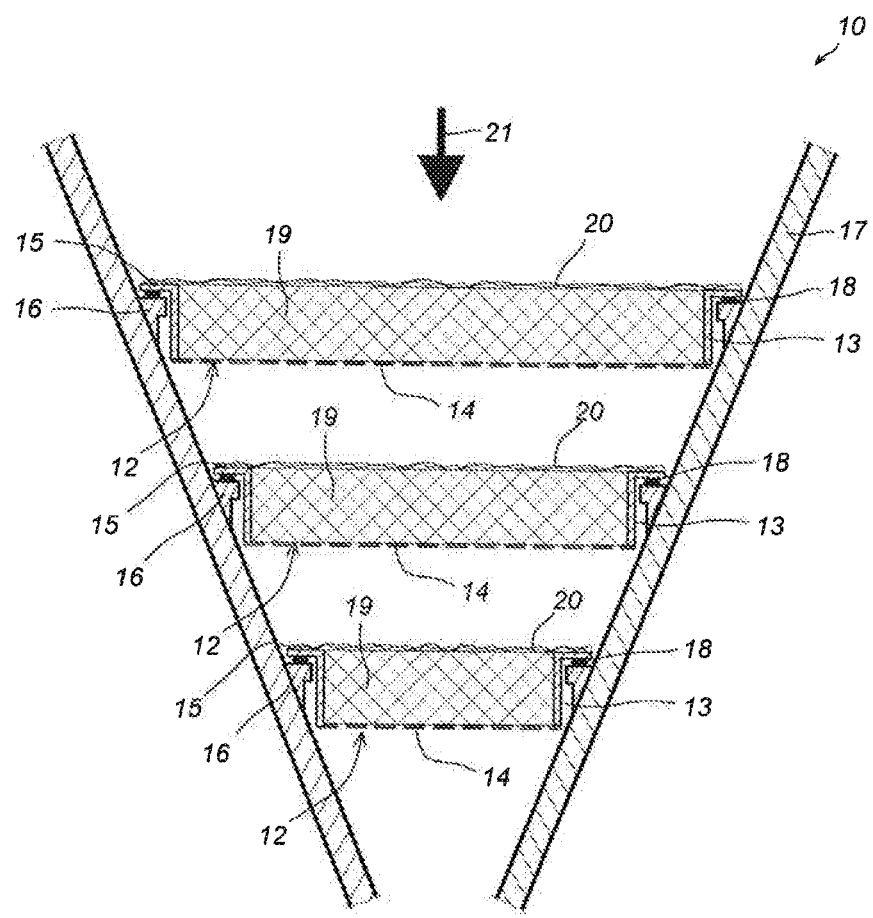
Figure 10:
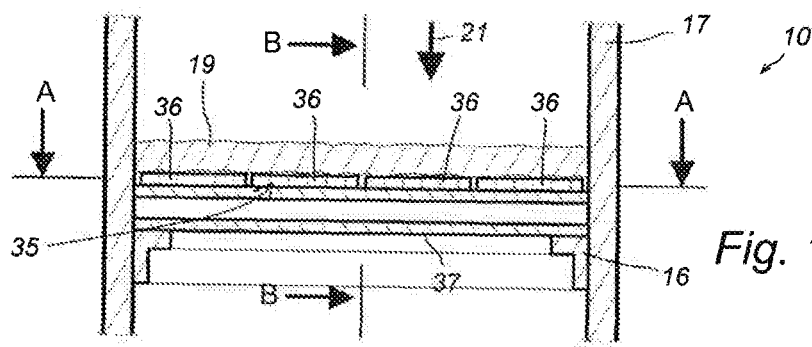
Figure 11:
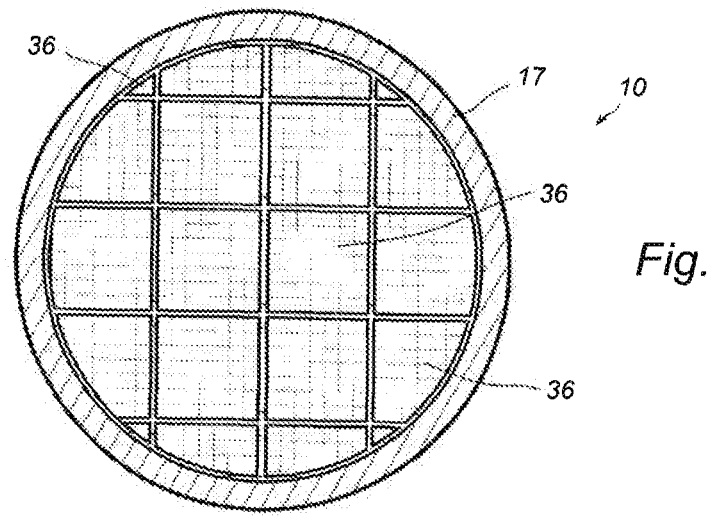
Figure 12:
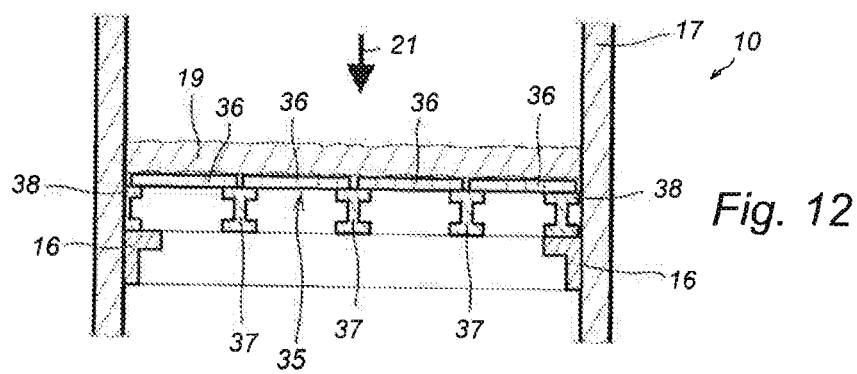
Figure 13:
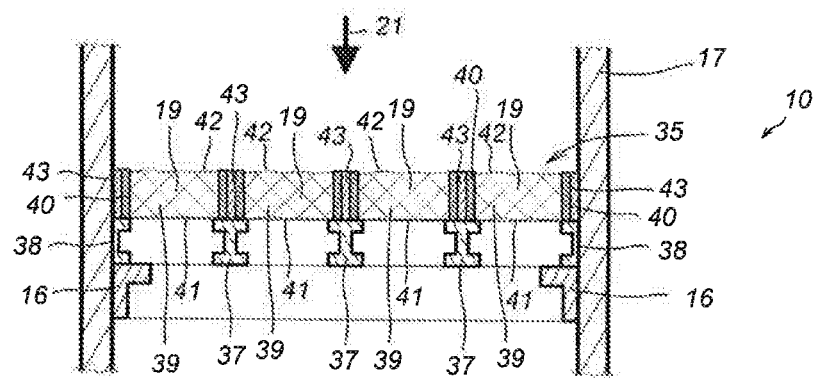
Figure 14:
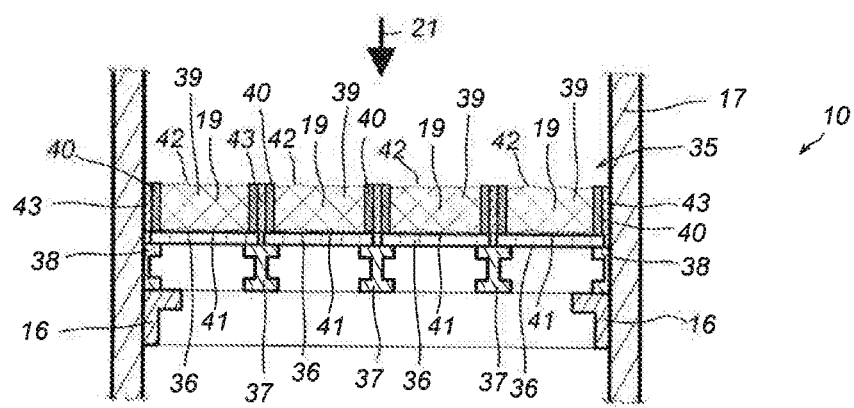
Figure 15:
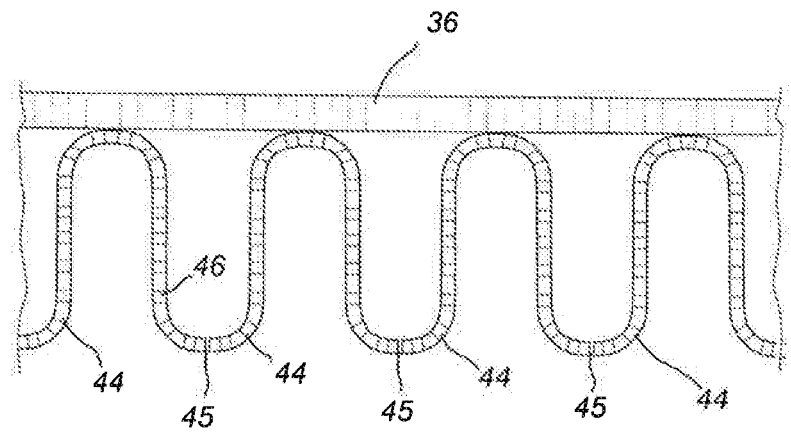
Figure 16:
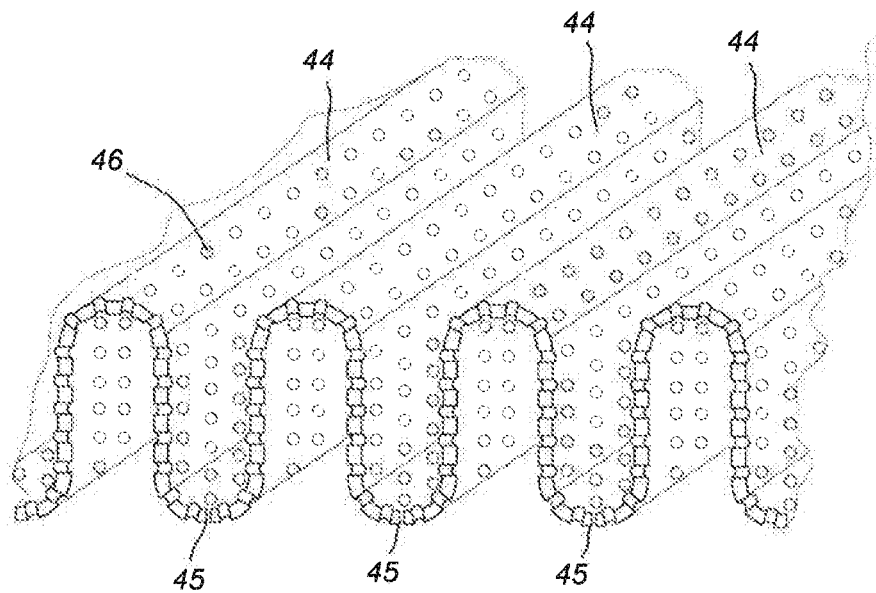

The drawings show:

FIG. 1 a schematic longitudinal section through one embodiment of a reactor according to the invention with a first variant of a one-piece internal element;

FIG. 2 a view corresponding to FIG. 1 of a second variant of a one-piece internal element;

FIG. 3 a view corresponding to FIG. 1 of a third variant of a one-piece internal element;

FIG. 4 a detail of FIG. 3;

FIG. 5 a view corresponding to FIG. 1 of a fourth variant of a one-piece internal element;

FIG. 6 a view corresponding to FIG. 1 of a fifth variant of a one-piece internal element;

FIG. 7 a view corresponding to FIG. 1 of a sixth variant of a one-piece internal element;

FIG. 8 a view corresponding to FIG. 1 of a seventh variant of a one-piece internal element;

FIG. 9 a longitudinal section through a conical reactor having three one-piece internal elements arranged in succession;

FIG. 10 a schematic longitudinal section through a preferred embodiment of a reactor having a multipiece internal element;

FIG. 11 a section along the line A-A in FIG. 10;

FIG. 12 a section along the line B-B in FIG. 10;

FIG. 13 a view corresponding to FIG. 10 of a second variant of a multipiece internal element;

FIG. 14 a view corresponding to FIG. 10 of a third variant of a multipiece internal element;

FIG. 15 a variant of a support for multipiece internal elements in longitudinal section; and FIG. 16 a perspective view of the support of FIG. 15.

In the figures, components in the various embodiments which perform the same or a corresponding function are denoted by the same reference numerals.

FIG. 1 shows a longitudinal section through a part of a reactor 10 in which a one-piece internal element 11 is arranged. In the example depicted, the one-piece component 11 is configured as a basket 12 which is bounded at the side by a vertical side wall 13 and on the underside by a perforated bottom 14. The vertical side wall 13 of the basket 12 goes over at the top into a horizontally outward-angled annular plate 15 which rests on a rest 16 which is joined to the wall 17 of the reactor 10, for example by welding. The annular plate 15 of the basket 12 is sealed against the rest by means of a seal 18. Catalyst material 19, which can, for example, be in the form of a bed of catalyst particles or in the form of a monolithic catalyst is present in the basket 12. The basket 12 can be covered at the top by a noble metal gauze 20. The arrow 21 indicates the flow direction of the gas stream of the heterogeneously catalyzed gas-phase reaction through the reactor 10.

In the embodiment of the reactor of the invention depicted in FIG. 2, a weighting element 22, for example one or more covering blocks or a circumferential covering ring, is additionally provided above the horizontally angled annular plate 15 in order to ensure secure positioning of the noble metal gauze and the catalyst bed.

The rest 16 is located in a region of the reactor 10 which is subject to particular thermal stress, since the heterogeneously catalyzed gas-phase reaction also proceeds in this region. Reliable fastening of the rest 16 to the inside of the reactor wall 17 is therefore technologically demanding. In the embodiment depicted in FIG. 3, this problem is solved by the reactor wall 17 being made up of a plurality of parts and having a step section 23 which is installed in the reactor wall 17 at the height of the internal element 11 and is joined to the remainder of the reactor wall by means of welds 24. The step section 23 of the reactor wall 17 has a side wall 25 and an annular protuberance 26 which projects inward and is configured in one piece with the side wall 25 and forms the rest for the internal element. The side wall 25 extends vertically above and below the annular protuberance 26 and thus forms part of the reactor wall. The step section 23 with its inward-projecting protuberance 26 can be configured as a turned or milled workpiece. In the interests of clarity, the workpiece forming the step section 23 is shown again in isolation in FIG. 4. Since the welds 24 are located at a greater distance from the region which is particularly thermally stressed in the vicinity of the basket 12, high-temperature problems in fastening of the rest in the embodiment depicted in FIG. 3 can be avoided more easily.

FIG. 5 depicts a fourth variant of a reactor having a one-piece internal element. The internal element 11 is again configured as a basket 12, but in contrast to the variants of FIGS. 1-3 the vertical side wall 13 is not angled horizontally to form an annular plate at its upper end in order to hang the basket 12 on the rest 16 and instead the basket 12 is seated entirely, once again via a sealing ring 18 arranged inbetween, on the rest 16.

The longitudinal section of FIG. 6 shows a further preferred embodiment of a one-piece internal element 11 configured as a basket 12, where an insulation element 27 composed of high-temperature ceramic is provided between the side wall 13 of the basket 12 and the rest 16 so as to thermally protect the inside of the reactor wall 17, in particular the side wall 25 of the step section 23. In the example depicted, the rest 16 is shown as part of a turned step section 23 as has been described in more detail in connection with FIG. 3. Of course, such an insulation element can also be used with rests 16 as have been depicted in FIGS. 1, 2 and 5.

FIG. 7 shows a longitudinal section through a further preferred embodiment having a one-piece internal element 11, with the wall 17 of the reactor 10 once again being made of a plurality of parts. In the upper and lower sections 28, 29 of the reactor wall which are subject to less thermal stress, the reactor wall consists of inexpensive normal steel. In the region of the internal element 11, the reactor wall 17 consists of an intermediate ring 30 made of high-temperature steel. In the example depicted, the upper and lower wall sections 28, 29 have connection flanges 31, 32 between which the intermediate ring is pressed in via sealing elements 33. In these regions, the reactor 10 can also be taken apart in a simple manner for maintenance purposes.

A further improvement of the variant of FIG. 7 is depicted in FIG. 8, where a weld lip seal 34 is additionally provided in the region of the intermediate ring 30 made of high-temperature steel of the reactor wall 17.

FIG. 9 shows a longitudinal section through a further preferred embodiment of a reactor 10 according to the invention. In this variant, three one-piece internal elements 11 which are arranged in succession in the flow direction and configured as baskets 12 are, by way of example, arranged in the reactor 10, as has already been described in detail in connection with the variant of FIG. 1. In the example depicted, the reactor wall 17 tapers from the top downward, so that the individual baskets 12 can easily be taken out through an upper assembly opening (not shown) of the reactor 10 despite the rests 16 which are fixed to the reactor wall 17. Devices, which are not shown in FIG. 9, for injecting intermediate gas, offtake device or mixing devices can be provided between the individual internal elements E.

FIG. 10 shows a longitudinal section through a further preferred embodiment of the reactor 10 of the invention having one internal element. In this variant, the internal element is configured as a multipiece internal element 35. The individual parts of the multipiece internal element 35 are formed by gratings 36 which are arranged on ceramic supports 37, 38 which in turn rest on the rest 16. Catalyst material 19 is installed, for example as a bed as shown in FIG. 10, on the gratings 36. However, the catalyst material can also be, for example, Installed in monolithic form on the gratings 36. The gratings 36 have a mesh-like or other perforated structure which ensures firstly that the gas stream can pass through and also that the catalyst material is retained on the gratings. The gratings 36 are preferably arranged at a particular distance from one another, so that thermally induced changes in the dimensions can be compensated.

The section depicted in FIG. 11 along the line A-A in FIG. 10 demonstrates the arrangement of the gratings 36 in a horizontal plane in the reactor 10. The shape and number of the gratings 36 is not subject to any restrictions but is selected so that the internal cross section of the reactor 11 is filled very completely with the required play between the gratings. In the section depicted in FIG. 12 along the line B-B in FIG. 10, it can be seen that in the depicted example the ceramic supports 37 have a cross section having a double-T geometry. The supports 37 are configured as straight-line supports in the example depicted. The supports 38 at the periphery can, for example, have a U-shaped cross section, with the base of the U being in contact with the inside of the reactor wall 17. The supports 38 at the periphery can also be configured as supports having a double-T geometry. In the schematic drawing of FIG. 12, both variants are depicted. The supports 38 at the periphery are preferably configured as segments and are fitted to the inside of the reactor wall 17 over an appropriate length.

FIG. 14 shows a longitudinal section through a further preferred embodiment of the reactor 10 of the invention having a multipiece internal element 35. In this embodiment, the multipiece internal element consists of baskets 39 which rest directly on the straight-line supports 37 having a double-T geometry and the supports 38 at the periphery. The ceramic baskets 39 are filled with catalyst material 19 in the form of catalyst beds or monolith catalysts. The baskets 39 of the multipiece internal element also have a perforated bottom 40 and optionally a noble metal gauze 41 at the top of the baskets 39. However, the noble metal gauze 41 is not provided. A particularly preferred use of the noble metal gauze is, for example, in nitric acid oxidation where the gauze itself serves as catalyst and the catalysts in the baskets bring about purification of the reaction gas to a certain extent. Like the gratings of FIGS. 10-12, the number and shape of the baskets 39 is such that they completely fill the internal cross section of the reactor with the appropriate play between the baskets. Since catalyst material 19 is present only in the baskets 39, the gaps between the baskets 39 have to be filled with a joint filling material 43, for example in the form of a high-temperature fiber mat, so that a bypass of the gas stream is prevented. The gap at the periphery between the baskets and the inside of the reactor wall 17 is also filled with a filling material 43, preferably with an insulation material.

In the embodiment depicted in FIG. 14, the multipiece internal element consists both of ceramic baskets 39 which are filled with catalyst material in the form of catalyst beds or monolith catalysts and also of ceramic gratings 36. The baskets 39 rest on the gratings 36, while the gratings 36 are, as in the variants of FIGS. 10-12, supported by ceramic supports 37, 38. Once again, a high-temperature-resistant joint filling material 43 in the form of high-temperature fiber mats has been introduced into the gaps between the baskets 39. In the example depicted, the base area of the baskets 39 corresponds to the base area of the gratings 36, but the respective base areas can also be selected independently of one another, so that, for example, a basket 39 can extend over a plurality of gratings 36.

The oxide-ceramic supports or support elements can have a variety of shapes. While supports 37 having a double-T shape or supports 38 having a U-shape were depicted in the previously described embodiments, FIGS. 15 and 16 show ceramic supports 44 which have a perforated structure having a wave-like profile. Here, FIG. 15 shows a cross-sectional view with a grating 36 arranged on the supports 44 and FIG. 16 shows a perspective view of the supports 44 without grating. In the example depicted, each support 44 consists of a single wave. Joining of a plurality of supports 44 at their longitudinal edges 45 forms the periodic structure depicted. In this way, large-area support structures for reactors can be produced more simply on an industrial scale. However, it is also possible to produce single supports 44 which consist of a plurality of wave trains. In addition, it can be seen that the supports 44 have openings 46 through which the gas of the gas-phase reaction can flow.

The invention will now be illustrated with the aid of an example of a heterogeneously catalyzed gas-phase reaction.

An ammonia/air mixture (12.5% by volume of $NH_3$, 87.5% by volume of air) is fed to the ammonia combustion furnace in which, as depicted in FIG. 1, a one-piece internal element is installed. The basket has an internal diameter of 3.52 m. The reactor is operated at an ammonia/air mixture throughput of 3650 standard $m^3$/h and per $m^2$ of catalyst gauze area. The temperature of the ammonia/air mixture entering the reactor is 28.4° C. and the pressure upstream of the platinum catalyst gauze in the reactor is 1089 mbar (abs.). At the platinum catalyst gauze, the ammonia burns at temperatures of about 880° C. to form the reaction product which is then passed through the catalytically active packing in the basket and comprises nitrogen monoxide as main component and small amounts of dinitrogen monoxide $N_2O$ ('nitrous oxide'). The nitrous oxide concentration in the reaction product immediately downstream of the platinum catalyst gauze, i.e. before reaching the catalytically active packing in the basket, is about 1000 ppm. The platinum gauze is followed by the basket which comprises a 150 mm deep layer of all-active catalyst extrudates, with these extrudates having a star-shaped cross section, a diameter of about 6 mm and a length of from 5 to 30 mm and consisting of a mixture of CuO, ZnO and $Al_2O_3$. The basket has a lateral delimitation which is about 250 mm high.

Samples of the reaction product can be taken directly after the platinum catalyst gauze (offtake point 1) and in the middle of the reactor downstream directly beneath the bottom of the basket (offtake point 2) and also at the periphery of the reactor downstream directly beneath the outer peripheral region of the bottom of the basket (offtake point 3) and analyzed to determine the nitrous oxide concentration by the GC/MS method. A further offtake point 4 is installed downstream after the basket and a subsequent waste heat exchanger unit.

In the experiment for comparative purposes, the same basket design (same dimensions) once in the conventional variant made of metal and in the case according to the invention made of an oxidic high-temperature fiber ceramic is used.

COMPARATIVE EXAMPLE 1 (NOT ACCORDING TO THE INVENTION)

In the continuous process, an ammonia/air mixture as described above is reacted using a metallic basket made of Inconel 600 (material number 2.4816).

In the peripheral region of the basket, the catalytically active packing has a funnel-shaped depression in the form of a trough having a depth of 96 mm. The height of the remaining bed in the peripheral region above the bottom is now only 54 mm (before the beginning of the experiment it was 150 mm).

The measured nitrous oxide concentration at the offtake point 3 directly underneath the funnel-shaped depression is 676 ppm of nitrous oxide, and at the offtake point 2 the measured nitrous oxide concentration is 186 ppm, so that the average measured nitrous oxide concentration downstream after the metallic basket and the waste heat exchanger unit installed downstream at the offtake point 4 is 227 ppm.

EXPERIMENTAL EXAMPLE 1 (ACCORDING TO THE INVENTION)

The comparative experiment according to the invention was carried out using a corresponding basket made of an oxide-ceramic high-temperature fiber ceramic.

The basket was produced by infiltrating an oxide ceramic fiber fabric made of Nextel™ 610 with an $Al_2O_3$-comprising slip and laminating this onto a pattern having the desired basket geometry. After drying at 100° C., the dried material was removed from the pattern and fired at 1250° C.

In the continuous process, an ammonia/air mixture is reacted as described above.

The peripheral region in the ceramic basket now has only a small funnel-shaped depression in the form of a trough having a depth of 37 mm in the catalytically active packing, the height of which in the peripheral region of the ceramic basket is now only 113 mm (before the beginning of the experiment it was 150 mm).

The measured nitrous oxide concentration at the offtake point 3 directly underneath the funnel-shaped depression is 316 ppm of nitrous oxide, and at the offtake point 2 the measured nitrous oxide concentration is 190 ppm, so that the average measured nitrous oxide concentration downstream after the oxide-ceramic basket and the waste heat exchanger unit installed downstream at the offtake point 4 is 199 ppm.

It can be seen that the tendency of the catalyst bed to undergo funnel formation is significantly reduced by the use of a basket made of high-temperature fiber ceramic because of the low thermal expansion of the oxide-ceramic basket and, correspondingly, the nitrous oxide concentration in the gas stream can be significantly reduced as a result of the lower bypass stream.

LIST OF REFERENCE NUMERALS

10 Reactor
11 One-piece internal element
12 Basket
13 Vertical side wall
14 Perforated bottom of the basket 12
15 Annular plate
16 Rest
17 Reactor wall
18 Seal
19 Catalyst material
20 Noble metal gauze of the basket 12
21 Arrow indicating the flow direction
22 Weighting element
23 Step section of the reactor wall
24 Weld
25 Side wall
26 Annular protuberance
27 Insulation element
28 Upper wall section
29 Lower wall section
30 Intermediate ring
31 Upper connection flange
32 Lower connection flange
33 Sealing element
34 Weld lip seal
35 Multipiece internal element
36 Grating
37 Straight-line ceramic support
38 Peripheral ceramic support; preferably U-profile, fitting the wall
39 Basket
40 Side wall of the basket 39
41 Perforated bottom of the basket 39
42 Noble metal gauze of the basket 39
43 Joint filling material in the form of high-temperature fiber mats
44 Wave-shaped ceramic support
45 Longitudinal edge of the support 44
46 Opening

The invention claimed is:

1. A reactor for carrying out heterogeneously catalyzed gas-phase reactions, having an internal element or a plurality of internal elements which are arranged in succession in the flow direction of the gas mixture of the heterogeneously catalyzed gas-phase reaction through the reactor, where the internal elements extend over the entire reactor cross section, wherein the one or more internal elements are at least partly made of a fiber composite ceramic material, where the fiber composite ceramic material is composed of a ceramic matrix in which ceramic fibers are embedded;
wherein the ceramic matrix and the ceramic fibers are composed of an oxide ceramic.

2. The reactor according to claim 1, wherein the one or more internal elements comprise internal elements for accommodating a heterogeneous catalyst and optionally additional quiescent elements through which the reaction gas does not flow and which do not comprise any catalyst material.

3. The reactor according to claim 1, wherein the reactor is designed for carrying out heterogeneously catalyzed gas-phase reactions at reaction temperatures of 600-1500° C.

4. The reactor according to claim 1, wherein the reactor has a cylindrical reactor wall.

5. The reactor according to claim 1, wherein the reactor cross section in the regions in which the one or more internal elements are arranged is greater than 0.25 m², with the maximum reactor cross section being in the range from 5 to 50 m².

6. The reactor according to claim 1, wherein the one or more internal elements arranged in succession in the flow direction of the gas mixture of the heterogeneously catalyzed gas-phase reaction through the reactor are made in one piece, as one-piece basket having a closed vertical side wall and a perforated bottom.

7. The reactor according to claim 6, wherein the one or more internal elements are in each case made as a one-piece basket having a closed vertical side wall and a perforated bottom, where the closed vertical side wall of the one-piece basket merges at its upper end with a horizontally angled annular plate which serves to position the one-piece basket on a rest, where the rest is configured as an annular console which is fastened to the inside of a reactor wall.

8. The reactor according to claim 7, wherein a seal which is formed by one or more layers of fiber mats or fiber tapes is provided between the horizontally angled annular plate and the rest.

9. The reactor according to claim 7, wherein the rest is configured as a step section which is integrated into they reactor wall and comprises a vertical side wall and a horizontal annular protuberance projecting into the interior of the reactor.

10. The reactor according to claim 1, wherein the one or more internal elements arranged in succession in the flow direction of the gas mixture of the heterogeneously catalyzed gas-phase reaction through the reactor have a multipiece construction.

11. The reactor according to claim 10, wherein the one or more multipiece internal elements arranged in succession in the flow direction of the gas mixture of the heterogeneously catalyzed gas-phase reaction through the reactor are configured as a plurality of individual gratings and/or as a plurality of individual baskets which in each case have their own side walls and perforated bottoms, with the gratings and/or the baskets being arranged on supports which allow passage of the gas mixture of the heterogeneously catalyzed gas-phase reaction.

12. The reactor according to claim 11, wherein the baskets are sealed against one another and/or against the inside of the reactor wall by means of an insulation material.

13. The reactor according to claim 11, wherein the supports are configured as spaced T-supports, or as support elements having a wave-like profile and a plurality of openings for passage of the gas mixture of the heterogeneously catalyzed gas-phase reaction.

14. The reactor according to claim 11, wherein both the one or more multipiece internal elements arranged in succession in the flow direction of the gas mixture of the heterogeneously catalyzed gas-phase reaction through the reactor and also the supports are made of fiber composite ceramic materials, but with the fiber composite ceramic material for the supports having a higher strength than the fiber composite material for the one or more multipiece internal elements arranged in succession in the flow direction of the gas mixture of the heterogeneously catalyzed gas-phase reaction through the reactor.

15. The reactor according to claim 1, wherein two, three or more internal elements which are arranged in succession in the reactor so as to allow the gas mixture of the heterogeneously catalyzed gas-phase reaction to flow through them are provided where the reactor wall has a conical geometry.

16. A method comprising carrying out heterogeneously catalyzed gas-phase reactions in the reactor according to claim 1.

17. The reactor according to claim 1, wherein the reactor is designed for carrying out heterogeneously catalyzed gas-phase reactions at reaction temperatures of 800 to 1000° C.

18. The reactor according to claim 1, wherein the reactor cross section in the regions in which the one or more internal elements are arranged is greater than 1 m$^2$, with the maximum reactor cross section being in the range from 10 to 30 m$^2$.

19. The reactor according to claim 6, wherein the one or more internal elements are in each case made as a one-piece basket having a closed vertical side wall and a perforated bottom, where the closed vertical side wall of the one-piece basket merges at its upper end with a horizontally angled annular plate which serves to position the one-piece basket on a rest, where the rest is configured as an annular console which is welded to the inside of a reactor wall.

20. A reactor for carrying out heterogeneously catalyzed gas-phase reactions, having an internal element or a plurality of internal elements which are arranged in succession in the flow direction of the gas mixture of the heterogeneously catalyzed gas-phase reaction through the reactor, where the internal elements extend over the entire reactor cross section, wherein the one or more internal elements are at least partly made of a fiber composite ceramic material, where the fiber composite ceramic material is composed of a ceramic matrix in which ceramic fibers are embedded;
   wherein the ceramic matrix and the ceramic fibers are composed of an oxide ceramic; and
   wherein the ceramic fibers have a diameter in the range of from 10 to 12 μm.

* * * * *